United States Patent

[11] 3,608,802

[72] Inventors Heinz Pons
Walldorf;
Gunter Lorek, Hochst, both of Germany
[21] Appl. No. 877,396
[22] Filed Nov. 17, 1969
[45] Patented Sept. 28, 1971
[73] Assignee Olympia Burosysteme GmbH
Frankfurt am Main, Germany
[32] Priority Nov. 16, 1968
[33] Germany
[31] P 18 09 335.1

[54] TWIN READ-OUT DEVICES
12 Claims, 8 Drawing Figs.

[52] U.S. Cl. .................................................. 226/90, 226/176
[51] Int. Cl. .................................................. G11b 15/66
[50] Field of Search .......................................... 226/89, 109, 110, 90, 176

[56] References Cited
UNITED STATES PATENTS
3,114,500 12/1963 Gavasso ..................... 226/109 X

*Primary Examiner*—Allen N. Knowles
*Attorney*—Michael S. Striker

ABSTRACT: Twin readout devices with parallel paths and aligned transporting rollers for two record carriers, are provided with control means for simultaneously adjusting one device to the width of a specific record carrier, and preparing the other device for a readout operation.

INVENTOR
HEINZ PONS
GUNTER BOREK
BY
ATTORNEY

INVENTOR
HEINZ PENS
GUNTER LORER
BY
[signature]
ATTORNEY

INVENTOR
HEINZ PONS
GUNTER LOREK

By: Michael J. Striker
ATTORNEY

INVENTOR
HEINZ PONS
GUNTER LOREK
By: Michael J. Striker
ATTORNEY

TWIN READ-OUT DEVICES

BACKGROUND OF THE INVENTION

Readout devices are known by which information stored in the form of punched holes in record carrier tapes or punched cards are sensed or read out. All readout derives of the prior art operate on the same principle. The perforated record carrier is transported by transporting rollers or a sprocket cooperating with a row of perforations, to pass sensing means whose brushes close circuits through coded holes so that control impulses are produced, or which are provided with a source of current and photo diodes which produce an impulse when light passes through the coded holes in the record carrier. Since the sensing takes a certain time, the record carrier is stepwise moved through the sensing station. The transporting means and sensing means together constitute the readout device.

It is known to provide several readout devices in one data processing apparatus in order to permit a more universal use of the same. However, due to the limited space available, the provision of several readout devices is often not possible, or causes difficulties during the operation of the data processing apparatus.

SUMMARY OF THE INVENTION

It is one object of the present invention to overcome the disadvantages of known readout devices, and to provide twin readout devices which take up little space.

Another object of the invention is to provide twin readout devices of simple and compact construction which reliably operate.

Another object of the invention is to provide twin readout devices in which two record carriers can be simultaneously read out.

Another object of the invention is to provide apparatus for simultaneously reading out a punched card and a perforated tape.

With these objects in view, one embodiment of the invention comprises a supporting frame including first and second supporting means, preferably horizontal walls projecting from a vertical wall, for guiding first and second record carriers along parallel first and second paths; first and second transporting means, preferably having a common driven shaft, mounted on the supporting frame for transporting the first and second record carriers; first control means for adjusting the width of the first path in accordance with the width of the first record carrier; second control means having a position cooperating with the second transporting means and a displaced position; and motion transmitting means connecting the first control means with the second control means. The arrangement is such that the second control means is operated by the actuated first control means to move to the displaced position for the preparation of the readout operation with a second record carrier.

One of the paths is suitable for a punched card, land the other may be used for a perforated tape.

The preparation for the processing of a record carrier having a given number of channels on one path, and for the processing of a punched card, or other record carrier on the other path, is effected by common control means.

It is characteristic of the invention that, while the paths of the record carriers are parallel, the adjustment to a different number of channels, and the preparation of the other path, take place simultaneously. By preparing the second path for the readout operation, the result is obtained that the transporting means start the transporting movement only when the record carrier is fed to the transporting means.

In the preferred embodiment of the invention, the path, which is prepared for the sensing operation, is associated with transporting means including a transporting roller, a counterpressure roller which is alternately advanced or retracted to effect an intermittent transport of the record carrier, and a control roller which is moved out of engagement with the transporting roller when the path of the other record carrier is adjusted to a specific number of channels.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
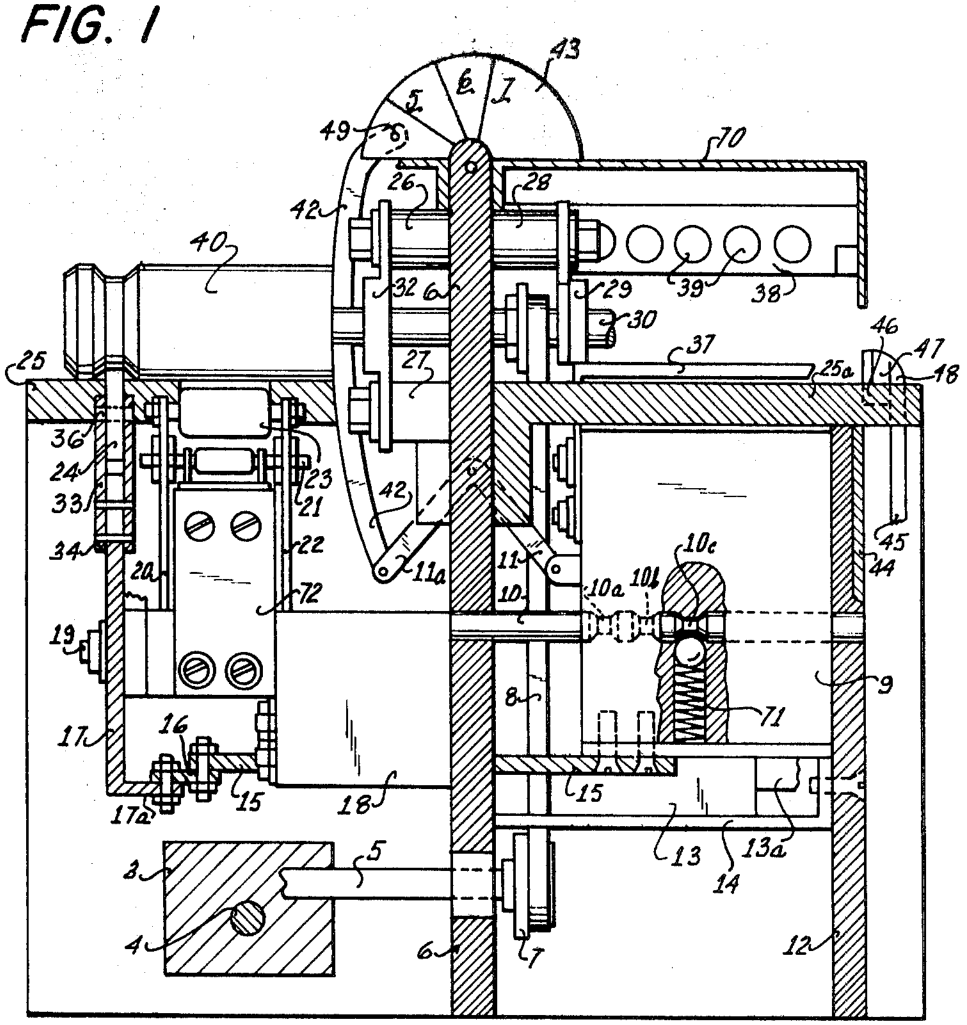
FIG. 1 is a fragmentary schematic vertical sectional view of twin readout devices, according to one embodiment of the invention.

As shown in FIG. 1, the supporting frame of the apparatus includes a central vertical wall 6 from which two horizontal walls 25 and 25project in opposite direction so that the top surfaces of the same a are located in the same horizontal plane and form paths along which two record carriers can be transported in parallel directions. A second vertical support wall 12 supports, together with vertical wall 6, a guide shaft 10 on which a slide block 9 is mounted for sliding movement between a plurality of positions in which recesses 10*a*, 10*b*, 10*c* are successively engaged by an arresting ball located in a bore in slide block 9, and biased by a spring 71.

The top potion of slide block 9 is of reduced thickness and projects through a slot in supporting wall 25*a* so that a horizontal arm 37 is located above the top surface of support wall 25*a* and forms a narrow gap with the same into which the record carrier can be inserted from the right, as viewed in FIG. 1, if a stop 47 is placed in a position, not shown, in which it is retracted into a recess in support wall 25*a*. A plurality of guide arms 37 and corresponding slots in support wall 25*a* is preferably provided, and each slot and guide arm is aligned with a stop 47. When slide block 9 is moved to the left, as viewed in FIG. 1, the distance between the left end of guide arm 37 and the stop 47 is increased so that a different record carrier can be inserted into the gap under guide arm 37 in the retracted position of stop 47, whereupon the stop 47 is returned to the illustrated operative position and defines together with guide arm 37 and the top surface of support wall 25*a*, the path of movement of the record carrier.

A shaft 30 is mounted in a bearing of vertical wall 6 and carries pulleys 31 about which a belt 8 passes. The other end of belt 8 passes over pulley 7 on a shaft 5 mounted in a bearing of vertical wall 6, and driven from the shaft 4 of a motor 3 through gear means, not shown, so that upon operation of motor 3, shaft 30 is driven.

Additional bearings 29 and 32 for shaft 30 are mounted on support elements 26, 27, 28 and secured by nuts and bolts to the vertical wall 6. The left-end portion of the shaft 30 is connected with a transporting roller 40 which is located above the horizontal wall 25, while the right-end portion of shaft 30 is connected with a transporting roller, not shown, which is positioned to transport a card located on the top surface of horizontal support wall 25*a*.

Supporting brackets 70 are mounted on vertical wall 6 on both sides of the same, the left supporting bracket 70 being only partly shown. As best seen on the right of FIG. 1, supporting bracket 70 carries a source of light 38 including a plurality of lamps 39, each of which is associated with a channel for a perforated tape. The lamps are connected in series so that failure of one lamp causes deenergization of all lamps which indicates the disturbance.

Stop 47 is mounted for turning movement on journal pins 46 and connected by pivot means 48 with links 45 so that upward movement of a link 45 places stop 47 in the operative position illustrated in FIG. 1, while downward movement of link 45 turns stop 47 to a position retracted into a recess of support wall 25*a* so that the left open end of the gap under guide arm 37 is accessible, and the record carrier can be inserted. Links 45 are part of a linkage shown in detail in FIGS. 2 and 3 by which stops 47 are connected with electromagnetic means 13 so that the stops can be moved between operative and retracted positions by control pulses supplied to electromagnetic means 13.

Figure 2:
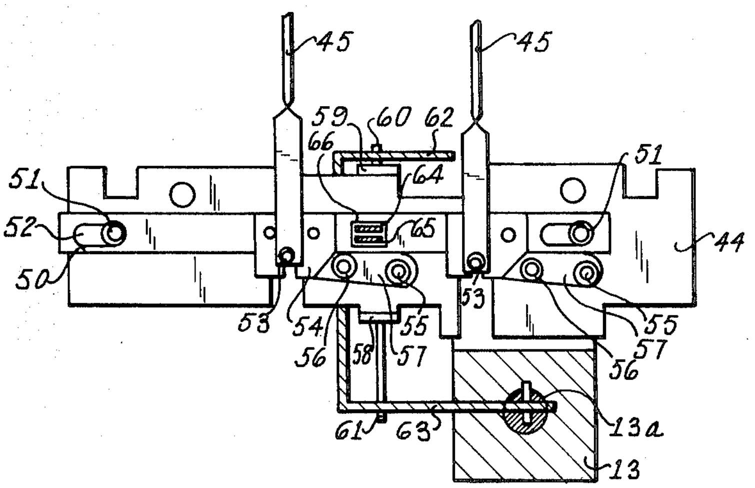
FIG. 2 is a fragmentary schematic side view, partially in vertical section, illustrating control means employed in the apparatus of FIG. 1.
Figure 3:
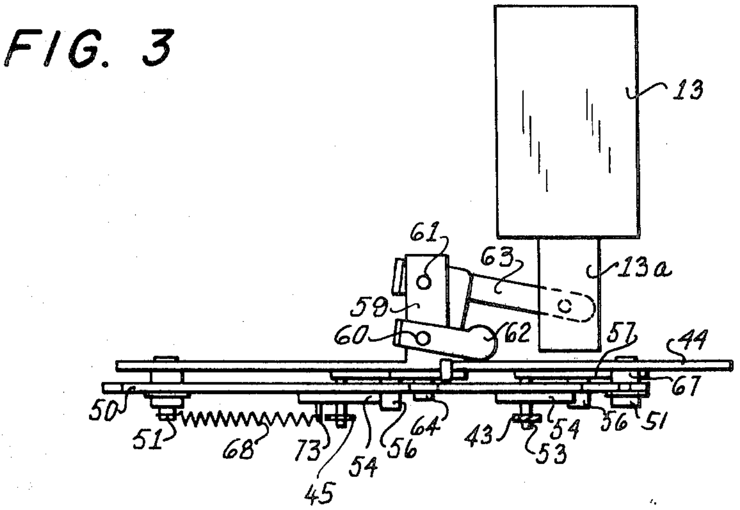
FIG. 3 is a fragmentary schematic plan view of the control means of FIG. 3.

As shown in FIGS. 2 and 3, the lower end of each link 45 is connected by pivot 53, the free end of a lever arm 57 which is mounted on a pivot 55 for angular movement, and has a guide roller 56. The supporting plate 44 is secured to wall 12, as shown in FIG. 1, and carries pivots 55 of lever arms 57. Guide rollers 56 are preferably made of a noise-reducing synthetic material. A bar 50 is mounted on support plate 44 by means of rivets 51 passing through slots 52 and being secured to support plate 44. Bar 50 carries cam portions 54 cooperating with guide rollers 56 to displace the same downward when bar 50 is shifted to the right, as viewed in FIG. 2. Cam portions 54 press lever arms 57 downward so that links 45 are pulled down to move stops 47 to the retracted positions when bar 50 is shifted to the right-end position.

Bar 50 has a cutout 66 in which two lever arms 64 and 65 are located. The lever arms 64 and 65 are parts of two levers 62 and 63 which have other arms extending in the direction transverse to arms 64 and 65. The bent levers 62 and 63 are respectively mounted on journal pins 60 on lugs 58 and 59 of support plate 44, as best seen in FIG. 2.

The free arm of lever 62 cooperates with a stop screw, not shown, so that its angular movement is limited in two end positions. By providing an adjustable stop screw for lever 62, the distance of movement of bar 50 between its end positions can be adjusted since displacement of bar 50 is transmitted by lever arm 64 to lever 62.

Lever 63 whose bent-transverse arm 65 projects into the cutout 66 in bar 50, is connected with the armature 13*a* of electromagnetic means 13. Electromagnetic means 13 is mounted on a support wall 14 which is secured to sidewall 12 and located under support wall 25*a*, as best seen in FIG. 1. The other end of support wall 14 is secured to the central wall 6.

When electromagnetic means 13 is energized by a pulse, lever 63 turns and arms 65 shifts bar 50 to the right so that cam portions 54 engage guide rollers 56 of lever arm 57 and pull links 45 downward so that stops 47 are turned to the retracted position located in slots of the wall 25*a*, permitting insertion of a perforated tape into the gap between guide arm 37 and the top surface of wall 25*a*. Before a readout operation, electromagnetic means 13 is deenergized, and a spring 68, see FIG. 3, is secured to rivet 51 and to a pin 73 on cam portion 55, pulls bar 50 to its left-end positions so that the spring-loaded lever arms 57 are returned to the initial position and links 45 are moved upward to place stops 47 in the operative position.

Figure 4:
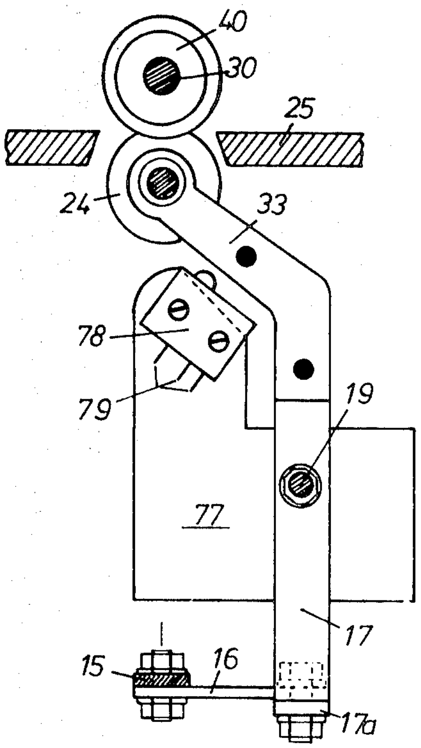
FIG. 4 is a fragmentary side elevation illustrating a control lever.
Figure 4A:
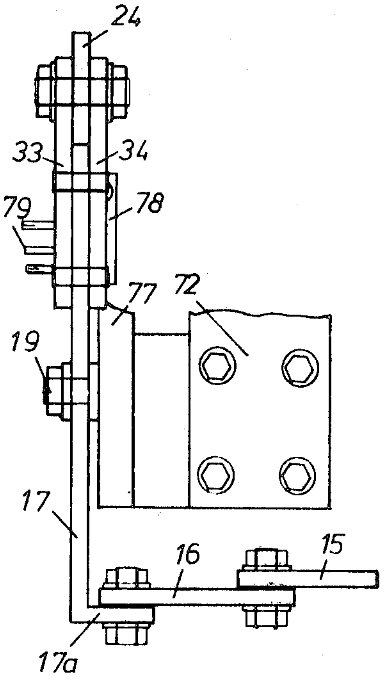
FIG. 4*a* is a fragmentary front elevation illustrating the control lever and its linkage.
Figure 4B:
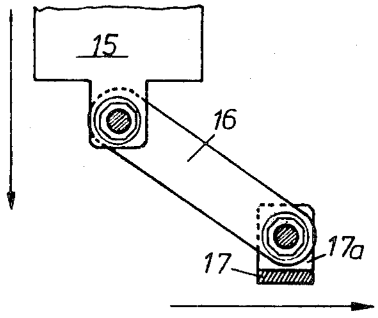
FIG. 4*b* is a fragmentary plan view of the control lever linkage.

By the first control means, including members 9, 37, 47 and the linkage means of FIGS. 2 and 3, the width of a first path for a record carrier means is adjusted. A motion transmitting bar 15 passing through an opening in central wall 6 is secured at one end to the bottom of slide block 9 of the first control means, and is connected at the other end by a pivot to a link 16 whose other end is connected by a pivot 17*a* to a transverse arm of a double-armed lever 17 which is mounted by pivot means 19 for angular movement about a horizontal axis, as best seen in FIGS. 4, 4*a*, and 4*b*. Pivot 19 is screwed into a portion of a support block 18 which caries an electromagnet 72, and is made of a synthetic material. Support block 18, which is secured to the vertical wall 6, has a cutout providing space for the scissorlike connection 15, 16, 17.

When motion transmitting bar 15 is shifted together with slide block 9, lever 17 turns about pivot 19. The upper end of lever 17 carries a pair of plates 33, 34 which form prongs for a journal pin 36 on which a control roller 24 is mounted for turning movement.

When lever 17 is turned about pivot 19, roller 24 is moved from the illustrated position cooperating with a recessed portion of transporting roller 40, to a displaced position in which control roller 24 does not engage transporting roller 40. In this manner, the left readout device is prepared for the following readout operation.

Prongs 33, 34 of lever 17 operate a switch 78 having connector plugs 79 which effects start of the drive of transporting roller 40 by shaft 30 when the record carrier is inserted under transporting roller 40. An electromagnetic clutch may be provided on shaft 30, an operated by the switch 78 under control of lever 17.

Slide block 9, and thereby lever 17, are operated simultaneously under the control of a manually operated semicircular disc 43 which has a knurled rim. Disc 43 is mounted for turning movement at the upper end of the vertical wall 6 and is connected by pivot 49 with a curved link 42 which is articulated with the arm 11*a* of an angular lever 11 which is also mounted on wall 6 for turning movement. The other arm lever 11 is connected by a pivot with a bracket projecting from slide block 9. A cutout is provided in vertical wall 6 for the angular lever 11.

When disc 43 is turned in clockwise direction, link 42 is pulled in upward direction and turns angular lever 11 so that slide block 9 is moved to the left and the width of the path for the record carrier means is increased as required by wider record carriers. During such movement of slide block 9 to the left, the motion transmitting bar 15 and the articulated link 16 turns lever 17 to the position in which control roller 24 does not engage transporting roller 40, and operates the switch for starting transporting roller 40.

It will be seen that the manually operated means 43, 42, 11 are part of the control means which include members 9, 37, 47 and the linkage shown in FIGS. 2 and 3, and that motion transmitting bar 15 connects the control means for the right portion of the apparatus with control means in the left portion of the apparatus, and including lever arm 17 and control roller 24.

Figure 5:
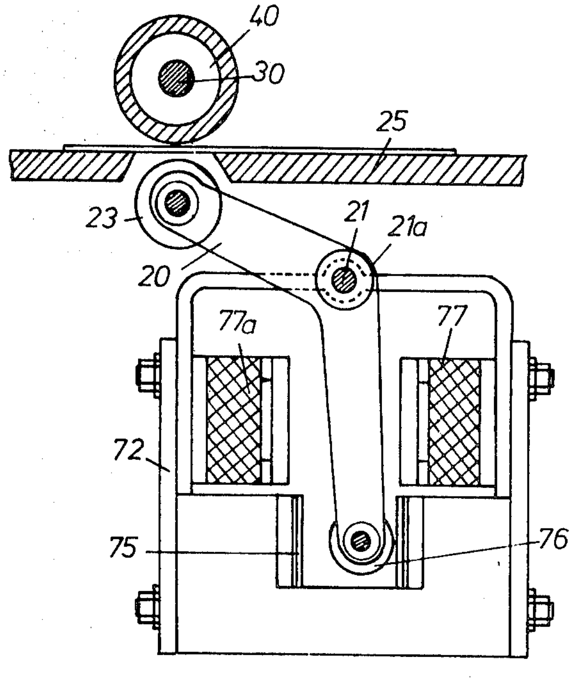
FIG. 5 is a fragmentary side view illustrating a transporting magnet.
Figure 5A:
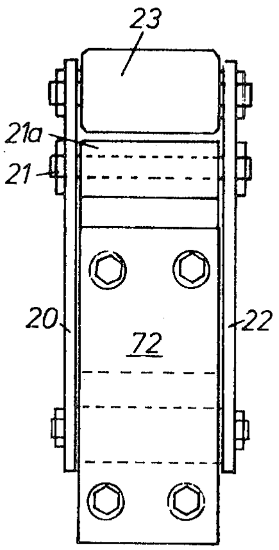
FIG. 5*a* is a fragmentary front view of the transporting magnet.

As best seen in FIGS. 5 and 5*a*, electromagnet 72 has two armature arms 20 and 22 mounted for turning movement on a journal pin 21 and having free ends supporting a counterpressure roller 23 for movement between a position cooperating with transporting roller 40, and a position spaced from the same. Electromagnet 72 has two windings, 77, 77*a* and by alternately energizing the two windings 77, 77*a*, counterpressure roller 23 is pressed against transporting roller 40 for transporting a record carrier, or retracted for the same, so that the record carrier stops during a sensing and readout operation. Levers 20, 20*a* support a roller 76 located between the pole shoes and abutting cushioned stops 75 in the two end positions of counterpressure roller 23.

It will be understood that each of the elements described above, or two or more together, may also find a useful application in other types of readout apparatus differing from the types described above.

While the invention has been illustrated and described as embodied in twin readout devices having common manually operated control means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the genergic or specific aspects of this invention.

What is claimed as new and desired to be protected by Letters Patent is set forth in the appended claims.

I claim:

1. Twin readout devices comprising, in combination, a supporting frame including first and second supporting means for guiding first and second record carrier means along first and second paths; first and second transporting means mounted on said supporting frame for transporting said first and second record carrier means along said first and second paths, respectively; first control means for preparing said first path for a readout operation of first record carrier means, and including means for adjusting the width of said first path in accordance with the width of said first record carrier means; second control means for preparing said second path for a readout operation of second record carrier means, said second control means having a position cooperating with said second transporting means, and a displaced position spaced from the same; operating means for said first control means; and motion transmitting means connecting said first and second control means so that said second control means is operated by said operated first control means so that said second control means moves to said displaced position when said first control means adjusts the width of said first path whereby readout operations of said first and second record carrier means are simultaneously prepared.

2. Twin readout devices as claimed in claim 1 wherein said first and second supporting means form parallel paths for said first and second record carriers.

3. Twin readout devices as claimed in claim 1 wherein said supporting frame includes a central vertical wall, and wherein said first and second supporting means are firsthand second horizontal walls projecting in opposite directions from the sides of said central vertical wall.

4. Twin readout devices as claimed in claim 3 wherein said first and second transporting means include first and second roller means located above said first and second horizontal walls, respectively, and a driven shaft connecting said first and second transporting means and being mounted on said central vertical wall; and comprising drive means for driving said driven shaft.

5. Twin readout devices as claimed in claim 3 wherein said operating means comprise a manually operated lever system mounted on said central vertical wall and connected with said first control means for actuating the same and thereby said second control means.

6. Twin readout devices as claimed in claim 5 wherein said motion transmitting means include a motion transmitting bar connected with said first control means; wherein said second control means include a control lever and a roller mounted on said control lever; and wherein said second transporting means include a second transporting roller cooperating with said control roller in said operative position of said second control means.

7. Twin readout devices as claimed in claim 7 wherein said first control means include a movable guide forming a laterally open guideway for the first record carrier, and a stop means movable between closing position for closing said guideway and a retracted position in which a first record carrier can be inserted into said guideway, linkage means connected with said stop means, and electromagnetic means for operating said linkage means for moving said stop means between said retracted and closing positions.

8. Twin read out devices as claimed in claim 7 wherein said first supporting means includes a horizontal wall formed with a slot for said movable guide, and with a recess in which said stop means is located in said retracted position; and wherein said linkage means includes a link pivotally connected with said stop means.

9. Twin readout devices as claimed in claim 7 wherein said linkage means includes a lever arm pivotally mounted at one end, and having the other end articulted to said link, a guide roller on said lever arm, a bar mounted for longitudinal movement and having at least one can portion cooperating with said guideroller, and a cutout, and lever means having an arm located in said cutout and another arm connected with said electromagnetic means; wherein said first supporting means includes a support plate located under said horizontal wall and having bent vertically spaced lugs formed with bores, and at least one journal pin mounted in said bores; and wherein said lever means are mounted on said journal pin.

10. Twin readout devices as claimed in claim 9 wherein said linkage means includes another journal pin mounted on said lugs; another lever means mounted on said other journal pin and having a stop arm cooperating with a stop, and another located in said cutout so that said bar moves between two end positions.

11. Twin readout devices as claimed in claim 10 wherein said linkage means include spring means for urging said linkage means to a normal position in which said bar is in one of said end positions.

12. Twin readout devices comprising, in combination, a supporting frame including first and second supporting means for guiding first and second record carrier means along first and second paths; first and second transporting means mounted on said supporting frame for transporting said first and second record carrier means along said first and second paths, respectively; first control means for preparing said first path for a readout operation of said record carrier means; second control means for preparing said second path for a readout operation of second record carrier means, and including a control lever, a switch operated by said control lever, means for driving said second transporting means controlled by said switch to start and stop, and a roller mounted on said control lever having a position cooperating with said transporting means and a displaced position spaced from the same; operating means for one of said first and second control means; and motion transmitting means connecting said first and second control means so that the respective other control means is operated by he operated one of said first and second control means whereby readout operations of said first and second record carrier means are simultaneously prepared.